United States Patent [19]

Grondman

[11] Patent Number: 4,498,629
[45] Date of Patent: Feb. 12, 1985

[54] APPARATUS FOR VAPORIZATION OF A HEAVY HYDROCARBON FEEDSTOCK WITH STEAM

[75] Inventor: Alexander Grondman, Klundert, Netherlands

[73] Assignee: Shell Oil Company, Houston, Tex.

[21] Appl. No.: 477,994

[22] Filed: Mar. 23, 1983

[30] Foreign Application Priority Data

May 26, 1982 [GB] United Kingdom ................. 8215352

[51] Int. Cl.$^3$ .............................................. B05B 7/04
[52] U.S. Cl. ................................................. 239/434.5
[58] Field of Search ..................... 239/434.5, 137, 433; 431/202, 190, 158, 350

[56] References Cited

U.S. PATENT DOCUMENTS

| | | | |
|---|---|---|---|
| 1,679,900 | 8/1928 | Higgins et al. | 239/137 X |
| 1,738,082 | 5/1928 | Stark | 239/434.5 |
| 2,008,130 | 7/1935 | Damm | 239/434.5 X |
| 3,790,086 | 2/1974 | Masai | 239/434.5 X |

Primary Examiner—Andres Kashnikow
Assistant Examiner—Kevin Patrick Weldon

[57] ABSTRACT

An apparatus for the vaporization of a heavy hydrocarbon feedstock with steam having first and second tubes arranged coaxially to form an annular space, an inlet for introducing a heavy hydrocarbon feedstock within the first tube and a second inlet for introducing superheated steam into the annular space. The first and second tubes terminate in open ends for the supplying of the superheated steam as annulus around a core of the heavy hydrocarbon feedstock. A frustoconically shaped element having an apex angle of less than 20 degrees is connected to the open end of the second tube.

6 Claims, 1 Drawing Figure

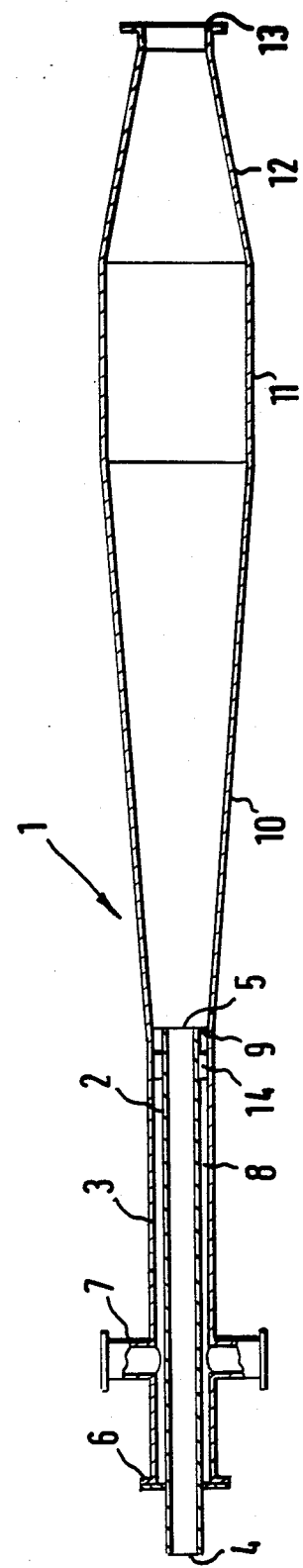

4,498,629

APPARATUS FOR VAPORIZATION OF A HEAVY HYDROCARBON FEEDSTOCK WITH STEAM

BACKGROUND OF THE INVENTION

The present invention relates to an apparatus for the vaporization of a heavy hydrocarbon feedstock, by mixing the hydrocarbon feedstock with superheated steam.

A well-known process for converting hydrocarbon feedstock to obtain valuable gaseous (mainly olefins) and liquid products is the so-called thermal cracking process. The hydrocarbon feedstock is normally diluted with superheated steam in order to favor the vaporization of the hydrocarbon feedstock, prior to introducing the vaporized hydrocarbon feedstock into the cracking section of a furnace. Such a process is also called steam-cracking and reduces the hydrocarbon partial pressure and contact time during the cracking phase. If processing heavy hydrocarbon feedstocks, e.g. materials with a boiling range above 300° C., the vaporization of the liquid material is normally carried out in a plurality of stages. The hydrocarbon feedstock is first preheated, whereafter the still liquid feedstock is admixed with superheated steam to form a gas/liquid two phase mixture while simultaneously heating the liquid. Further heating the mixture of the steam and liquid droplets to partially vaporize the liquid, fully vaporizing the liquid by introducing a further amount of superheated steam into the flow of steam and partially vaporized liquid. The steam is, for example, added to the hydrocarbon feedstock by means of a nozzle wherein steam is introduced as an annulus around a core of the hydrocarbon feedstock.

It has been found that in the known nozzles coke forms in the flowline, especially at the location where steam is introduced for the final vaporization step. Although the occurrence of coke formation cannot be fully scientifically explained, it might be assumed that the following happens in a coke formation. In the partially vaporized liquid, the lighter fractions are in the vapor phase whereas the heavier fractions are still in the liquid phase. When the partially vaporized liquid is further contacted with superheated steam to finalize the vaporization, the temperature of the liquid droplets upon contact with the steam will immediately rise to the steam temperature. Part of the lighter components in the liquid drops will immediately be vaporized, having as consequence that a skin of heavy material, especially for the larger drops, can be formed via evaporation and chemical change and further evaporation will be limited by the slow diffusion of lighter material through the outer skin of the droplets. The inability of the droplets to completely evaporate would lead to coke formation upon further subjection to the high steam temperature. Furthermore, drops of liquid reaching the wall of the mixing nozzle would easily stick onto the wall thereby experiencing a long residence time, during which the liquid droplets are subjected to high temperatures. The long residence time of the liquid droplets on the wall of the mixing nozzle will result in a high risk of coke formation on said wall. Due to coke formation the passage for liquid and steam in the mixing nozzle is diminished, resulting in an increase of the pressure drop over the mixing nozzle.

When the pressure drop increase becomes excessive the thermal cracking operation must be stopped for cleaning the mixing nozzle. It will be understood that this is a time consuming and costly operation.

SUMMARY OF THE INVENTION

The object of the present invention is to provide an apparatus for the vaporization of a heavy hydrocarbon feedstock, using steam, while minimizing the risk of coke formation.

The apparatus for the vaporization of a heavy hydrocarbon feedstock with steam according to the invention comprises a first tubular element and a second tubular element surrounding the first tubular element to form an annular space. The first tubular element and the second tubular element have substantially coinciding longitudinal axes. A first inlet means is provided for introducing a heavy hydrocarbon feedstock into the first tubular element and a second inlet means is provided for introducing superheated steam into the annular space. The first tubular element and the second tubular element are each provided with an open end for the supply of the superheated steam as an annulus around a core of the heavy hydrocarbon feedstock, the open ends terminating in openings arranged in a plane, substantially perpendicular to the longitudinal axes. The apparatus also includes a frustoconically shaped element at one end connected to the open end of the second tubular element, provided with a longitudinal axis substantially coinciding with the longitudinal axes of the tubular elements and diverging in a direction away from the second tubular element, the frustoconically shaped element having an apex angle of at most 20 degrees.

The arrangement of a slightly diverging frustoconically shaped element behind the location where the superheated steam meets the heavy hydrocarbon feedstock prevents the contact of liquid droplets with the wall of the element thereby avoiding the risk of coke formation in the apparatus.

BRIEF DESCRIPTION OF THE DRAWING

The invention will now be described by way of example only with reference to the accompanying drawing showing a longitudinal section of an apparatus constructed according to the invention.

DESCRIPTION OF THE PREFERRED EMBODIMENT

The drawing shows a nozzle 1 for supplying superheated steam to a partially vaporized heavy hydrocarbon feedstock for total vaporization thereof. The nozzle 1 comprises an inner or first tubular element 2 and an outer or second tubular element 3 having coinciding longitudinal axes. The inner tubular element 2 is open at both ends to form an inlet 4 and an outlet 5 for the partially vaporized heavy hydrocarbon feedstock. The outer tubular element 3 being open at one end, is closed at the other end by means of a flange 6 welded to the inner tubular element 2. A number of inlet nozzles 7, being substantially equally distributed over the circumference of the outer tubular element 3 are provided for the supply of superheated steam into an annular space 8 between the inner tubular element 2 and the outer tubular element 3. In order to prevent the occurrence of swirls in the annular space 8 a plurality of guide vanes 14 are arranged and substantially uniformly distributed over the cross section of the annular space 8. The open end of the outer tubular element 3 and the outlet 5 of the inner tubular element 2 are arranged in a plane perpendicular to the coinciding longitudinal axes of the tubular elements 2 and 3 thereby forming an annular passage 9 for the discharge of superheated steam from the annular space 8. At its open end the outer tubular element 3 is connected to a frustoconically shaped element 10 provided with a longitudinal axis substantially coinciding with the longitudinal axes of the tubular elements. The frustoconically shaped element 10 diverges in a direction away from the outer tubular element 3. The frustoconically shaped element 10 has an apex angle of at most 20 degrees. The minimum apex angle of the element 10 is suitably chosen as being at least 6 degrees.

The base of the frustoconically shaped element 10 is connected to a tubular element 11, which is in its turn connected to a second frustoconically shaped element 12, converging in a direction away from the tubular element 11. The frustoconically shaped element 12 is at its free end provided with a flange 13 for connecting the nozzle 1 to a feed line (not shown) of a thermal cracking unit.

The operation of the nozzle will now be described with reference to the above-mentioned nozzle elements.

The nozzle 1 is arranged in a system for vaporization of heavy hydrocarbon feedstock prior to passing the feedstock to a cracking unit. A heavy hydrocarbon feedstock in liquid form is first passed through a preheater for heating the liquid, the heated liquid is subsequently mixed with superheated steam and passed through a furnace for partly vaporizing the liquid hydrocarbons to, for example, 70 percent vapor.

The partly vaporized liquid is subsequently mixed with a further quantity of superheated steam to evaporate the remaining liquid in the feedstock. The steam which is used in the last vaporization step should be superheated to such a temperature that the steam sensible heat is sufficient to vaporize the remaining liquid and give an extra margin of superheat to avoid the risk of condensation after mixing. Condensation of the steam should be avoided in view of the risk of erosion of the system.

At least the second mixing step should be carried out in a nozzle as described with reference to the drawing. In this nozzle superheated steam is introduced into the annular space 8 via the steam inlet nozzles 7, whereas the partially vaporized liquid is inroduced into the inner tubular element 2 via the inlet 4 thereof.

The steam leaving the annular space 8 via the annular outlet passage 9, forms an annulus around the core of hydrocarbon feedstock leaving the inner tubular element 2 via outlet 5.

The heat of the steam causes vaporization of the liquid remaining in the partially vaporized liquid leaving the inner tubular element 2. To prevent the passage of liquid droplets from the core of hydrocarbon feedstock to the wall of the nozzle with the aforementioned risk of coke formation, the annulus of steam and the core of hydrocarbon feedstock are passed through the frustoconically shaped element 10 located downstream of the outer tubular element 3.

The apex of the cone pertaining to the frustoconically shaped element 10 should be at most 20 degrees to prevent the occurrence of undesirable turbulence in the steam upon flowing into the frustoconical element 10. Due to such a turbulence it is possible that still unvaporized liquid droplets may pass through the annulus of steam and adhere to the wall of the frustoconically shaped element, leading to coke formation.

It has been found that an apex angle of about 6 degrees is sufficient to obtain the desired flow pattern in the frustoconically shaped element 10. A suitable apex angle is, for example. 16 degrees.

By the arrangement of the frustoconically shaped element 10, radial transport of the liquid droplets will not cause these droplets to reach the wall of the element 10.

The vaporization of liquid is completed in the tubular element 11 downstream of the frustoconically shaped element 10. The total length of the frustoconically shaped element 10 and the tubular element 11 should be so chosen that all liquid has been vaporized prior to leaving said tubular element. The mixture of steam and vapor is subsequently introduced into a cracking furnace via the frustoconically shaped connecting element 12. In the furnace the vapor is first superheated and, in an adjacent radiant section finally heated at such a temperature that the hydrocarbon is cracked and converted into lighter fractions, which are recovered downstream the furnace via suitable compression and condensation steps.

It should be noted that the cross sectional area of the second tubular element is so chosen, that for a given amount of steam, required for a given amount of hydrocarbon feedstock, a high velocity of the steam in the annular space 8 is obtained, for example, about 75–80 m/s.

What is claimed is:

1. Apparatus for the vaporization of a heavy hydrocarbon feedstock with steam, said apparatus comprising:
    first and second tubular elements, said tubular elements having a uniform cross-section and disposed coaxially to form an annular space surrounding said first tubular element;
    first inlet means, said first inlet means being coupled to said first tubular element for introducing a heavy hydrocarbon feedstock to said first tubular means;
    second inlet means, said second inlet means being coupled to said second tubular element for introducing superheated steam to said annular space;
    both said first and second tubular elements terminating in open ends arranged in a plane perpendicular to the longitudinal axis of the tubular elements, said open ends supplying said steam as a nonswirling annulus around a core of said hydrocarbon; and
    a frustoconical shaped element, having an apex angle of less than 20 degrees, the small end of said frustoconical shaped element being coupled to the open end of said second tubular element, the axis of said frustoconical element being coaxial with said first and second elements.

2. Apparatus as claimed in claim 1, wherein the apex angle of the frustoconically shaped element is at least 6 degrees.

3. Apparatus as claimed in claim 1 or 2, wherein the large end of the frustoconically shaped element is connected to one end of a third tubular element having a longitudinal axis substantially coaxial with the longitudinal axes of the first and the second tubular elements.

4. Apparatus as claimed in claim 1 or 2, having a plurality of second inlets substantially equally distributed over the circumference of the second tubular element.

5. Apparatus as claimed in claim 1 or 2, wherein a plurality of guide vanes are arranged in the annular space, downstream of the second inlet, said guide vanes being substantially uniformly distributed over a cross section of the annular space.

6. Apparatus as claimed in claim 3, wherein the other end of the third tubular element is connected to a frustoconically shaped connecting element converging in a direction away from the third tubular element.

* * * * *